United States Patent [19]
Allread et al.

[11] Patent Number: 5,398,723
[45] Date of Patent: Mar. 21, 1995

[54] FLUID COUPLING WITH ADJUSTABLE PRESSURE RELIEF VALVE

[75] Inventors: Alan R. Allread, Armada; William C. Marrison, Jackson, both of Mich.

[73] Assignee: Aeroquip Corporation, Maumee, Ohio

[21] Appl. No.: 202,937

[22] Filed: Feb. 28, 1994

[51] Int. Cl.6 ............................................. F16L 37/28
[52] U.S. Cl. ............................ 137/614.03; 137/614.04
[58] Field of Search ............... 137/614.04, 614.05, 137/614.03, 614, 614.02; 251/149.6, 149.8, 322, 321, 323

[56] References Cited

U.S. PATENT DOCUMENTS

| | | | |
|---|---|---|---|
| 2,505,093 | 4/1950 | Brock | 137/614.04 |
| 4,327,770 | 5/1982 | Brown et al. | 137/614.05 |
| 4,896,697 | 1/1990 | Strömdahl | 137/614.03 |
| 5,123,446 | 6/1992 | Haunhorst et al. | 137/614.03 X |
| 5,179,976 | 1/1993 | Boland et al. | 137/614.04 X |
| 5,211,197 | 5/1993 | Marrison et al. | 137/614.04 |
| 5,215,122 | 6/1993 | Rogers et al. | 137/614.04 |

Primary Examiner—Martin P. Schwadron
Assistant Examiner—Kevin L. Lee
Attorney, Agent, or Firm—Emch, Schaffer, Schaub & Porcello Co.

[57] ABSTRACT

A quick disconnect coupling for a liquid handling system is disclosed. When disconnected the first and second coupling members are valved closed. The second coupling member includes an adjustable pressure relief feature. By moving an adjustment member, the operating pressure for the pressure relief can be varied and set at a desired level.

11 Claims, 3 Drawing Sheets

FLUID COUPLING WITH ADJUSTABLE PRESSURE RELIEF VALVE

BACKGROUND OF THE INVENTION

This invention relates to a quick disconnection fluid coupling. The coupling is constructed of first and second coupling members and more particularly mating male and female coupling elements. When the coupling is in its unconnected position, a pressure relief feature is provided to relieve an undesired increase in pressure in the fluid system which incorporates the coupling. More particularly, the present invention is directed to a quick disconnect fluid coupling which not only includes a pressure relief feature but an adjustable pressure relief feature.

Quick disconnect fluid couplings are known in the art. One such quick disconnect fluid coupling is disclosed in U.S. Pat. No. 5,215,122, which was granted Jun. 1, 1993. As indicated in that patent, one use of quick disconnect fluid couplings is in communication and navigational systems for civilian and military aircraft. Removable preprogrammed cards are inserted in the communication and navigational system hardware. During a flight, heat is generated within such cards by virtue of the resistance heating which results from electrical current flowing through the electrical elements on the cards. To cool the card, fluid systems have been designed which include fluid couplings, according to the present invention. When a card is removed from the system, the quick disconnect fluid couplings are in a disconnected condition. An increase in ambient temperature can result in an undesired pressure condition because of the small volume involved. It is desirable to provide an integral pressure relief feature, whereby the coupling can be bled to reduce the pressure. It is the primary object of the present invention to provide an improved pressure relief feature which includes an adjustable pressure relief valve.

SUMMARY OF THE INVENTION

The present invention is directed to an improved quick disconnect coupling for a liquid handling system with an integral pressure relief feature. The present invention provides an adjustable pressure relief valve as a part of the fluid coupling.

A first coupling member defines a longitudinal opening and an adapter body is mounted within the first coupling member. A first valve is mounted for movement within the adapter body and a spring urges the first valve toward a closed position.

A second coupling member mounts a second valve having a longitudinally extending valve stem and includes a sleeve which defines a valve seat. A guide member surrounds the valve stem and is fixed in an opposed relationship to the sleeve. A spring is operatively positioned between the guide member and the sleeve for urging the valve toward a closed position.

An additional spring is provided in the second coupling member to urge the valve head toward the valve seat. An adjustment member positioned adjacent the valve stem is engaged with the additional spring means. The adjusting member allows the force of the spring to be increased or decreased. The adjusting feature is used to change the operating pressures for the pressure relief valve.

DETAILED DESCRIPTION OF THE PREFERRED EMBODIMENT

Figure 1:
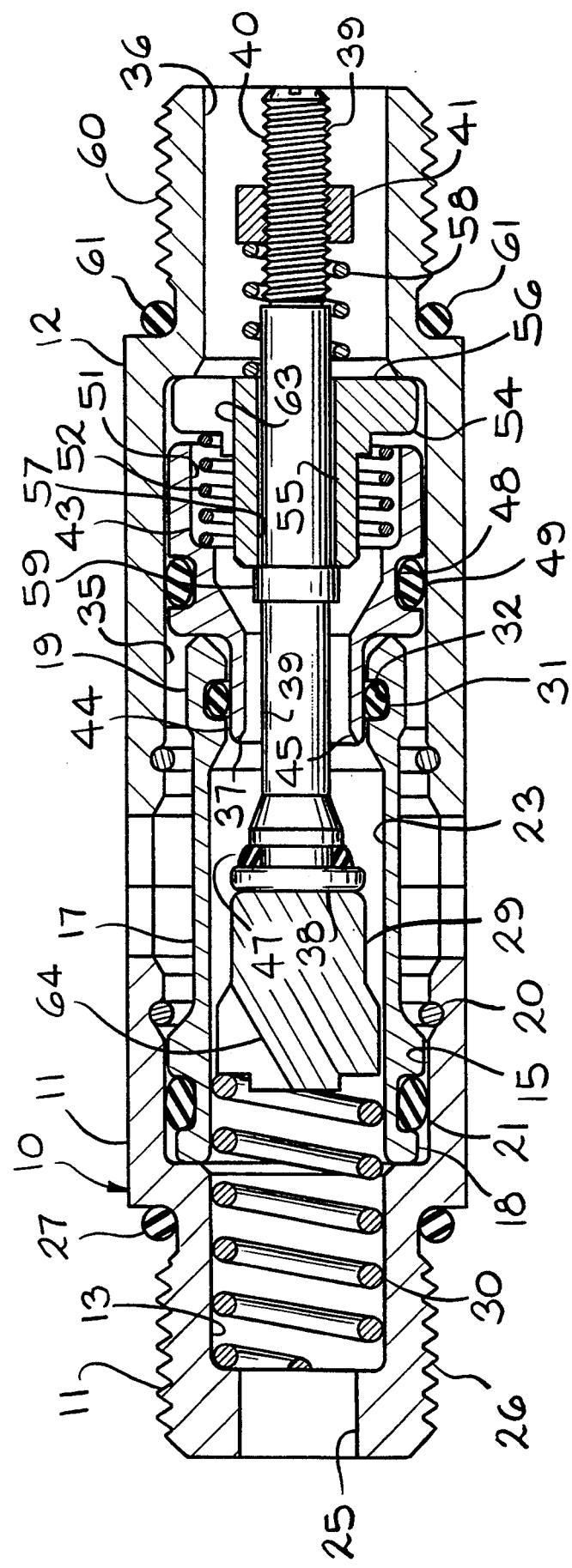
FIG. 1 is a cross sectional view of a fluid coupling, according to the present invention, in the coupled position.

A fluid coupling, according to the present invention, is generally indicated by the reference number 10 in FIG. 1. The fluid coupling 10 includes a first coupling member 11 and a second coupling member 12. In the present embodiment, the first coupling member 11 is a female coupling member while the second coupling member 12 is a male coupling member.

Figure 2:
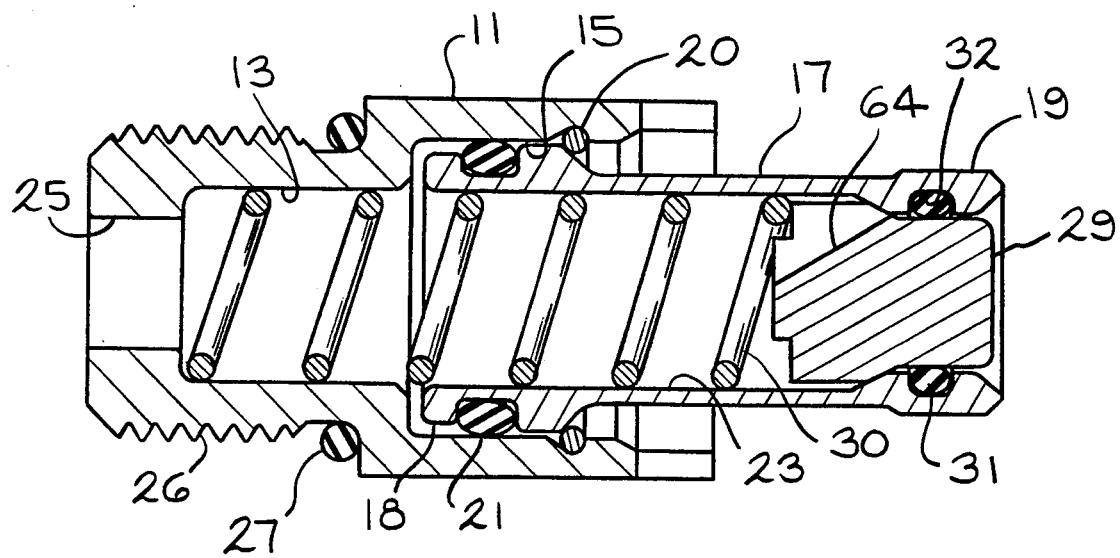
FIG. 2 is a cross sectional view of the first coupling member in the uncoupled position.

FIG. 1 illustrates the fluid coupling 10 in its connected or coupled position. While in this position, fluid is transmitted through the fluid coupling 10. Referring to FIG. 2, the first coupling member 11 defines a longitudinal opening 13 having a first diameter. The first coupling member 11 also includes a larger diameter portion 15. An adapter body 17 has a first end 18 which is mounted in the larger diameter portion 15 of the first coupling member 11. The adapter body 17 includes a second end 19 which extends outwardly from the first coupling member 11. A circular retainer 20 secures the adapter body 17 to the first coupling member 11. A packing ring 21 is provided in a groove on the first end 18 of the adapter body 17. The packing ring 21 is in engagement with the first coupling member 11 to prevent fluid flow between the components. The packing ring 21 allows for misalignment of the adapter body 17 relative to the first coupling member 11. During connection of the coupling members 11 and 12, if a misalignment occurs leakage does not result, thereby providing a no spill unit.

The adapter body 17 defines a longitudinal opening 23 which is complementary with the longitudinal opening 13 defined in the first coupling member 11. An opening 25 is defined at the end of the first coupling member 11. Exterior threads 26 are provided on the end of the first coupling member 11 to permit the coupling member 11 to be secured to a fitting (not shown). A packing ring 27 provides a liquid tight connection with the fitting. A first valve 29, in this embodiment a poppet valve, is positioned for movement within the longitudinal opening 23. A spring 30 is positioned within the aligned longitudinal openings 13 and 23. The spring 30 urges the first valve 29 toward the closed position, shown in FIG. 2. A packing ring 31 is positioned within a groove 32 defined by the interior of the second end 19 of the adapter body 17. The packing ring 31 ensures a liquid seal when the valve 29 is closed, as shown in FIG. 2.

Figure 3:
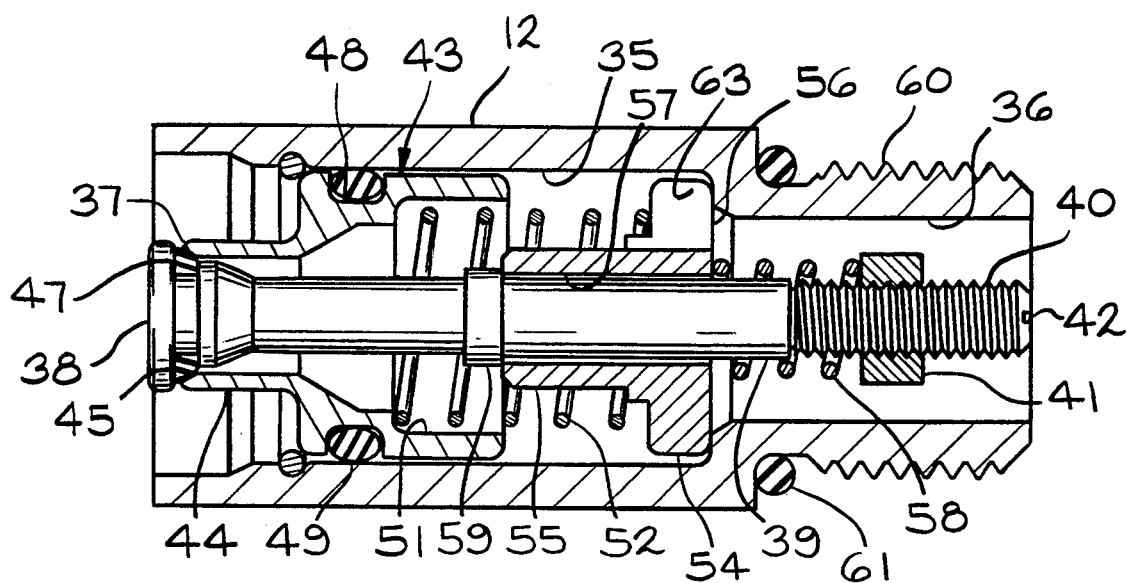
FIG. 3 is a cross sectional view, similar to FIG. 2, of the second coupling member.
Figure 4:
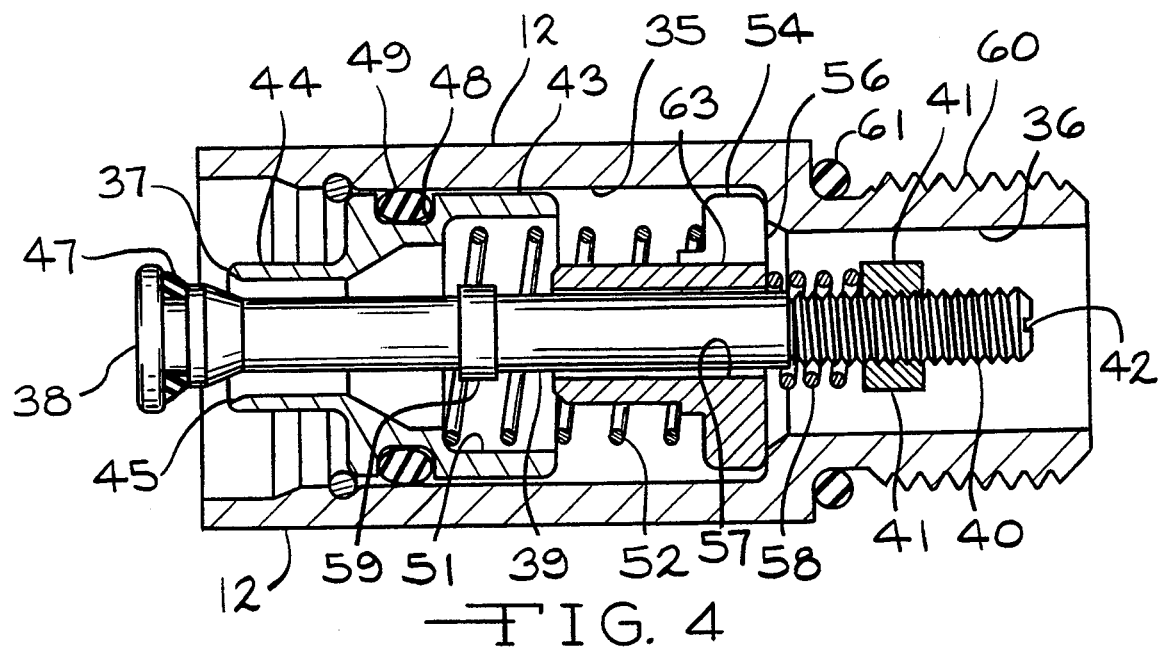
FIG. 4 is a cross section view, similar to FIG. 3 showing the second coupling member in its pressure relief mode.

Referring to FIGS. 3 and 4, the fluid coupling 10 includes the second coupling member 12 which defines an enlarged longitudinal opening 35 and a second aligned longitudinal opening 36 having a reduced diameter. A second valve 37 having a valve head 38 and a rearwardly extending valve stem 39 is positioned for movement within the second coupling member 12. The rear end of the valve stem 39 includes threads 40 which threadably mount an adjusting member 41. The adjusting member 41 is self locking, retaining its position when placed along the threads 40. In the present embodiment, the self locking feature is a self locking thread on the adjusting member 41. A sleeve 43 is movably positioned within the second coupling member 12 and surrounds the valve stem 39. The sleeve 43 includes a front portion 44 of a reduced diameter which defines a circular valve seat 45. Referring to FIG. 3, an elastomeric seal 47 is molded onto the valve head 38 and cooperates with the valve seat 45 when the valve 37 is in its closed position, as shown in FIG. 3.

The exterior of the sleeve 43 defines a groove 48 which mounts a packing ring 49. The interior of the sleeve 43 defines a cup portion 51 which mounts one end of a spring 52. A guide member 54 has a shaft 55 and a base 56. The shaft 55 defines a central opening 57 which receives the valve stem 39. The guide member 54 is fixably mounted in opposed relationship with the sleeve 43. The spring 52 receives the shaft 55 and the end of the spring 52 engages the base 56 of the guide member 54, The spring 52 urges the sleeve 43 and the valve seat 45 toward the closed position, as shown in FIG. 3. A spring 58 surrounds the valve stem 39 and extends between the base 56 of the guide member 54 and the adjustment member 41. The spring 58 urges the valve head 38 toward the closed position, as shown in FIG. 3. The spring force of the spring 58 may be adjusted by rotating the adjustment member 41. Lengthening of the spring cavity by rotation of the adjustment member 41 reduces the spring force. Normally, the operating pressure of the fluid coupling 10 is between 10 psig and 30 psig.

When the second coupling member 12 is uncoupled from the first coupling member 11 it assumes the closed position shown in FIG. 3. The spring 52 has urged the sleeve 43 to the left as shown in FIG. 3 and the valve head 38 is positioned in a closed position relative to the valve seat 45 of the sleeve 43. A ring 59 having a diameter larger than the diameter of the central opening 57 of the guide member 54 is provided on the valve stem 39. The ring serves as a stop to ensure the correct positioning of the valve head 38 and the valve seat 45 when moved to the closed position.

In the event that the internal pressure within the fluid coupling member 12 is increased, for example if the ambient temperature increases the volume of the fluid, as soon as the pressure overcomes the force of the spring 58, a pressure relief mode is activated and the valve head 38 is moved away from the valve seat 45 to relieve the pressure (see FIG. 4). The present invention includes the adjustment member 41 which may be rotated to move the self locking adjustment member 41 longitudinally along the threaded portion of the valve stem 39. A holding means such as a screw driver slot 42 is provided in the end of the valve stem 39 adjacent the threads 40 to secure the stem 39 against rotation while moving the adjustment member 41. Other holding means (not shown) which can be used in other embodiments are a hex wrench opening or a collet. Moving the adjustment member 41 to the right, as viewed in FIG. 4, lengthens the spring cavity and reduces the spring force. This in turn provides a lower pressure at which the pressure relief function of the second coupling member 12 operates. Moving the adjustment member to the left, shortens the spring cavity and increases the spring force. This provides a higher pressure at which the pressure relief function of the second coupling member 12 operates.

The second coupling member 12 is also provided with exterior threads 60 and a packing ring 61 adjacent the threads 60. The exterior threads 60 are utilized to connect the second coupling member 12 to a fitting (not shown).

Referring to FIGS. 2, 3 and 1, when the first coupling member 12 or female coupling member 11 is connected to the second coupling member or male coupling member 12, the valve head 38 engages the first valve or poppet valve 29 and moves the first valve 29 to the left (as shown in FIG. 1) against the force of the spring 30. At the same time, the second end 19 of the adapter body 17 engages the sleeve 43 and moves the sleeve 43 to the right (as shown in FIG. 1) against the force of the spring 52. When the fluid coupling 10 is in the coupled position shown in FIG. 1, a path of fluid flow is provided through openings 63 in the base 56 of the guide member 54; through the sleeve 43; through openings 64 in the poppet valve 29; and outwardly through the opening 25 in the first coupling member 11. When in this position, both the first valve 29 and the second valve 37 are in their open positions.

When the fluid coupling 10 is uncoupled, both the first coupling member 11 and the second coupling member 12 move under the forces of the respective springs 30 and 52 to the closed position shown in FIGS. 2 and 3.

Many revisions may be made to the best mode of the invention as described above, without departing from the scope of the invention or from the scope of the following claims.

We claim:

1. A fluid coupling comprising first and second coupling members, said first coupling member defining a longitudinal opening, an adapter body mounted within said first coupling member, said adapter body having a longitudinal opening, a first valve mounted for movement within said adapter body and spring means mounted within said first coupling member for urging said first valve toward a closed position, said second coupling member defining a longitudinal opening, a second valve having a valve stem positioned within said longitudinal opening, a sleeve movably positioned within said second coupling member, said sleeve defining a valve seat, a guide member having a central opening for receiving said valve stem mounted within said second coupling means, second spring means positioned within said second coupling means for urging said sleeve toward a closed position and third spring means within said second coupling member for urging said second valve toward the closed position.

2. A fluid coupling, according to claim 1, including an adjustment member adjacent said valve stem and engaged with said third spring means.

3. A fluid coupling, according to claim 2, wherein said valve stem includes a threaded portion, said adjustment member being threadably mounted on said threaded portion.

4. A fluid coupling, according to claim 3, wherein said adjustment member is self locking, retaining its position along said threaded portion.

5. A fluid coupling, according to claim 3, wherein said third spring means surrounds said valve stem and extends between said guide member and said adjusting member.

6. A fluid coupling, according to claim 1, wherein said first coupling member defines a larger diameter portion, said adapter body being positioned within said larger diameter portion and having an outwardly extending end portion, said outwardly extending end portion of said adapter body engaging said sleeve when said first and second coupling members are joined, whereby movement of said sleeve opens said second valve.

7. A fluid coupling, according to claim 6, whereby said second valve engages said first valve when said first and second coupling members are joined, whereby movement of said first valve opens said first valve.

8. A fluid coupling, according to claim 6, including means for retaining said adapter body in said first coupling member.

9. A fluid coupling, according to claim 1, wherein such central opening has a first diameter, a ring having a diameter larger than said first diameter positioned on said valve stem, whereby said ring engages said guide member when said second valve is moved to such closed position.

10. A fluid coupling, according to claim 1, including a packing ring provided between said first coupling member and said adapter body, whereby no spill results if said first and second coupling members are misaligned during connection.

11. A fluid coupling comprising first and second coupling members, said first coupling member defining a longitudinal opening, an adapter body mounted within said first coupling member, said adapter body having a longitudinal opening, a first valve mounted for movement within said adapter body and spring means mounted within said first coupling member for urging said first valve toward a closed position, said second coupling member defining a longitudinal opening, a second valve having a valve stem positioned within said longitudinal opening, a sleeve movably positioned within said second coupling member, said sleeve defining a valve seat, a guide member having a central opening for receiving said valve stem mounted within said second coupling means, second spring means positioned within said second coupling means for urging said sleeve toward a closed position, third spring means within said second coupling member for urging said second valve toward the closed position and an adjustment member adjacent said valve stem and engaged with said third spring means.

* * * * *